(12) United States Patent
Jacob et al.

(10) Patent No.: US 12,415,915 B2
(45) Date of Patent: Sep. 16, 2025

(54) ISOBUTYLENE-CONTAINING COMPOSITIONS AND ARTICLES MADE THEREOF

(71) Applicant: ExxonMobil Chemical Patents Inc., Baytown, TX (US)

(72) Inventors: Sunny Jacob, Seabrook, TX (US); Yuan-Ju Chen, Houston, TX (US); Sujith Nair, League City, TX (US); Bemard D'Cruz, Bangalore (IN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 746 days.

(21) Appl. No.: 16/971,222

(22) PCT Filed: Dec. 5, 2018

(86) PCT No.: PCT/US2018/063957
§ 371 (c)(1),
(2) Date: Aug. 19, 2020

(87) PCT Pub. No.: WO2019/164567
PCT Pub. Date: Aug. 29, 2019

(65) Prior Publication Data
US 2021/0087376 A1    Mar. 25, 2021

Related U.S. Application Data

(60) Provisional application No. 62/632,551, filed on Feb. 20, 2018.

(51) Int. Cl.
C08L 23/22    (2025.01)
C08K 3/04    (2006.01)
C08K 3/34    (2006.01)

(52) U.S. Cl.
CPC .............. *C08L 23/22* (2013.01); *C08K 3/04* (2013.01); *C08K 3/346* (2013.01)

(58) Field of Classification Search
CPC ............ C08L 23/22; C08K 3/04; C08K 3/346
See application file for complete search history.

(56) References Cited

U.S. PATENT DOCUMENTS

| | | |
|---|---|---|
| 4,916,180 A | 4/1990 | Robinson et al. |
| 5,080,942 A | 1/1992 | Yau |
| 5,807,629 A | 9/1998 | Elspass et al. |
| 5,886,106 A | 3/1999 | Sumner et al. |
| 6,034,164 A | 3/2000 | Elspass et al. |
| 6,087,454 A | 7/2000 | Vanhaeren et al. |
| 6,710,116 B1 | 3/2004 | Waddell et al. |
| 6,960,632 B2 * | 11/2005 | Kaszas ...................... C08F 8/20 525/332.8 |
| 7,402,633 B2 | 7/2008 | Kaszas |
| 2003/0204008 A1 | 10/2003 | Campion |
| 2004/0079462 A1 | 4/2004 | Tracey et al. |
| 2007/0106024 A1 | 5/2007 | Tsou et al. |
| 2008/0221274 A1 | 9/2008 | Jourdain |
| 2017/0226238 A1* | 8/2017 | Gu .......................... C08K 5/134 |

FOREIGN PATENT DOCUMENTS

| | | |
|---|---|---|
| WO | 9924506 A | 5/1999 |
| WO | 01/21672 | 3/2001 |
| WO | 0231044 A | 4/2002 |
| WO | WO-2007011456 A2 * | 1/2007 ............. B82Y 30/00 |

* cited by examiner

*Primary Examiner* — Angela C Scott
(74) *Attorney, Agent, or Firm* — ExxonMobil Technology and Engineering Company

(57) ABSTRACT

The present invention provides a composition having a $C_4$ to $C_7$ isoolefin, an alkylstyrene, and a diolefin, where the $C_4$ to $C_7$ isoolefin is not the same as the diolefin. The invention also provides a composition having a first $C_4$ to $C_7$ isoolefin and paramethylstyrene component and a second $C_4$ to $C_7$ isoolefin and paramethylstyrene component. Further, the invention also provides a composition having (a) an elastomer with a $C_4$ to $C_7$ isoolefin, an alkylstyrene, and a diolefin, where the $C_4$ to $C_7$ isoolefin is not the same as the diolefin, (b) a secondary rubber, (c) processing aid, (d) curative, and (e) filler.

15 Claims, No Drawings

ISOBUTYLENE-CONTAINING COMPOSITIONS AND ARTICLES MADE THEREOF

CROSS-REFERENCE OF RELATED APPLICATIONS

PRIORITY CLAIM

This application is a National Phase Application claiming priority to PCT Application Serial No. PCT/US2018/063957, filed Dec. 5, 2018 which claims priority to and the benefit of U.S. Provisional Application No. 62/632,551, filed Feb. 20, 2018 the disclosures of which are incorporated herein by reference.

FIELD OF THE INVENTION

This invention relates to compositions with brominated butyl rubbers and optionally other polymers, suitable for tire components such as innerliners.

BACKGROUND OF THE INVENTION

Halobutyl rubbers, which are halogenated isobutylene/isoprene copolymers, are the polymers of choice for best air retention in tires for passenger, truck, bus and aircraft vehicles. Bromobutyl rubber, chlorobutyl rubber and halogenated star-branched butyl rubbers can be formulated for specific tire applications, such as tubes or innerliners. The selection of ingredients and additives for the final commercial formulation depends upon the balance of properties desired, namely, processability and tack of the green (uncured) compound in the tire plant versus the in-service performance of the cured tire composite. Examples of these elastomers are butyl (isobutylene-isoprene rubber or IIR), bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene copolymer or BIMSM), etc. The present application focuses on processability of halogenated isoolefin polymers, including BIMSM.

It is known to form conventional tire innerliners using brominated copolymers of isobutylene and para-methylstyrene, and blends of these copolymers with other polymers. See, for example, U.S. Pat. Nos. 5,807,629, and 6,034,164. Halogenated butyl rubbers have proved to be particularly advantageous for adhesion behavior, flexural strength, service life, and for impermeability to air and water. Due to the use of tire inner liners which are based on halogenated butyl rubbers, the tire carcass and the steel or textile cords which are employed therein are protected from attack by moisture and oxygen contained in the air inflation. This has a positive effect on the life of pneumatic tires, including those of highly stressed truck tires. However, improving the physical properties of halogenated butyl rubbers, for example, by increasing the halogen content in the butyl rubber (improving adhesion properties), has not been targeted by tire manufacturers.

The present invention is directed at using halogenated butyl rubbers mixed with at least one other butyl rubber component with dissimilar microstructures due to the disadvantages of using pure halogenated butyl rubbers as the rubber material for inner liners. The inventors surprisingly discovered that the properties of the resulting composition improved, such as aged property retention, aged hardening, crack growth, and flex fatigue.

SUMMARY OF THE INVENTION

In one embodiment, the present invention provides a composition comprising a $C_4$ to $C_7$ isoolefin, an alkylstyrene, and a diolefin, wherein the $C_4$ to $C_7$ isoolefin is not the same as the diolefin. In another embodiment, the present invention provides a composition comprising a first $C_4$ to $C_7$ isoolefin and paramethylstyrene component and a second $C_4$ to $C_7$ isoolefin and paramethylstyrene component. In a further embodiment, the present invention provides a composition comprising an elastomer having a $C_4$ to $C_7$ isoolefin, an alkylstyrene, and a diolefin, wherein the $C_4$ to $C_7$ isoolefin is not the same as the diolefin; a secondary rubber; processing aid; curative; and filler.

DETAILED DESCRIPTION

The following language is of the best presently contemplated mode or modes of carrying out the invention. This description is made for the purpose of illustrating the general principles of the invention and should not be taken in a limiting sense. The scope of the invention is best determined by reference to the appended claims.

This invention describes an uncured, filled elastomer composition with processability, a process for making a useful article from the composition, and the useful articles so made. The composition or article in one embodiment is a composition of a halogenated elastomer and optionally other polymers, also including carbon black as a reinforcing filler, suitable for use as an air barrier, e.g. as an innerliner or innertube.

Elastomer

The composition of the present invention includes an elastomer comprising $C_4$ to $C_7$ isoolefin derived units. The elastomer can be halogenated. The isoolefin may be a $C_4$ to $C_7$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene.

The elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and can also include functionalized interpolymers wherein at least some of the alkyl substituent groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

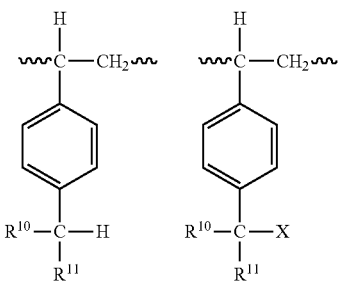

wherein $R^{10}$ and $R^{11}$ are independently hydrogen, lower alkyl, preferably $C_1$ to $C_7$ alkyl, and primary or secondary alkyl halides and X is a functional group such as halogen. Preferably $R^{10}$ and $R^{11}$ are hydrogen. Up to 60 mole percent of the para-substituted styrene present in the interpolymer structure may be a functionalized structure in one embodiment, and in another embodiment from 0.1 to 5 mole percent. In yet another embodiment, the amount of functionalized structure is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 or 30 weight percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. These halogenated elastomers are commercially available as EXXPRO™ Elastomers (ExxonMobil Chemical Company, Houston TX), and abbreviated as "BIMSM." These elastomers can, if desired, have a substantially homogeneous compositional distribution such that at least 95% by weight of the polymer has a para-alkylstyrene content within 10% of the average para-alkylstyrene content of the polymer.

Preferred polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

In accordance with the invention, the elastomer has a Mooney viscosity less than 27, and between 15 and 26, between 15 and 21, between 15 and 18 in other embodiments. Desirable interpolymers can also be characterized by a narrow molecular weight distribution ($M_w/M_n$) of less than 5, more preferably less than 2.5.

The interpolymers can also be characterized by a preferred viscosity average molecular weight in the range of from 2,000 up to 2,000,000 and a preferred number average molecular weight in the range of from 2500 to 750,000 as determined by gel permeation chromatography. In particular embodiments it may be preferable to utilize two or more interpolymers having a similar backbone, such as a low molecular weight interpolymer having a weight average molecular weight less than 150,000 can be blended with a high molecular weight interpolymer having a weight average molecular weight greater than 250,000, for example.

In an embodiment, the polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety. In an embodiment, the polymers may be prepared by directly functionalizing with different functional moiety without a bromination step.

Fillers and Other Additives

The composition of the invention may also include one or more filler components such as calcium carbonate, clay, mica, silica and silicates, talc, titanium dioxide, and carbon black. As used herein, fillers can include inorganic clay and/or organoclay particles. In one embodiment, the filler is carbon black or modified carbon black. The filler is semi-reinforcing grade carbon black present at a level of from 10 to 150 phr of the blend, more preferably from 30 to 120 phr, and especially from 35 to 100 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

Other possible fillers to be added to the elastomer include nano-sized talcs. Such talcs have a very high surface area in comparison to conventional sized talc platelets. The nano-sized talcs have a maximum dimension in the 100 to 200 nm range.

In another embodiment of the invention, improved interpolymer impermeability is achieved by the presence of at least one polyfunctional curative. An embodiment of such polyfunctional curatives can be described by the formula Z—$R^{17}$—Z', wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (D. R. Smith, ed., Lippincott & Petto Inc. 2001). The polyfunctional curative, if present, may be present in the composition from 0.1 to 8 phr in one embodiment, and from 0.2 to 5 phr in yet another embodiment.

The addition of fillers such as calcium carbonate, clay, mica, silica and silicates, talc, titanium dioxide, and carbon black raises the Mooney viscosity of the elastomer from the starting value of less than 27 to a level comparable to the Mooney viscosity of commercial elastomers often used in manufacturing air impermeable rubber compounds.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbamate) and other dithiocarbamates, Tetrone A (dipentamethylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the composition of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the composition.

Composition Properties

In another embodiment, the composition formed results in an improved air impermeability of the composition, such as having an oxygen transmission rate of 160 mm·cc/[$m^2$·day] at 40° C. or lower as measured on compositions or articles as described herein.

Alternatively, the oxygen transmission rate is 150 mm·cc/[$m^2$·day] at 40° C. or lower as measured on compositions as described herein; the oxygen transmission rate is 140 mm·cc/[$m^2$·day] at 40° C. or lower as measured on compositions as described herein; the oxygen transmission rate is 130 mm·cc/[$m^2$·day] at 40° C. or lower as measured on compositions as described herein; the oxygen transmission rate is 120 mm·cc/[m2·day] at 40° C. or lower as measured on compositions as described herein; the oxygen transmission rate is 110 mm·cc/[$m^2$·day] at 40° C. or lower as measured on compositions as described herein; the oxygen transmission rate is 100 mm·cc/[$m^2$·day] at 40° C. or lower as measured on compositions as described herein; the oxygen transmission rate is 90 mm·cc/[$m^2$·day] at 40° C. or lower as measured on compositions as described herein; the oxygen transmission rate is 80 mm·cc/[$m^2$·day] at 40° C. or lower as measured on compositions as described herein; or, the oxygen transmission rate is 70 mm·cc/[$m^2$·day] at 40° C. or lower as measured on compositions as described herein.

Secondary Rubber Component

A secondary rubber or "general purpose rubber" component may be blended with the disclosed compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; other poly(isobutylene-co-p-methylstyrene) and halogenated poly(isobutylene-co-p-methylstyrene) elastomers, such as, for example, terpolymers of isobutylene derived units, p-methylstyrene derived units, and p-bromomethylstyrene derived units that have monomer contents, molecular weights, Mooney viscosities, chain branching indices or other properties not meeting the above BIMSM specifications, and mixtures thereof. Many of these rubbers are described by Subramaniam in RUBBER TECHNOLOGY 179-208 (M. Morton, Chapman & Hall 1995), THE VANDERBILT RUBBER HANDBOOK 105-122 (R. F. Ohm ed., R. T. Vanderbilt Co., Inc. 1990), or E. Kresge and H. C. Wang in 8 KIRK-OTHMER ENCYCLOPEDIA OF CHEMICAL TECHNOLOGY 934-955 (John Wiley & Sons, Inc. 4th ed. 1993).

A desirable embodiment of the secondary rubber component present is natural rubber. Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. A suitable ethylene-propylene rubber is commercially available as VISTALON™ (ExxonMobil Chemical Company, Houston TX).

In another embodiment, the secondary rubber is a halogenated rubber as part of the terpolymer composition. The halogenated butyl rubber is brominated butyl rubber, and in another embodiment is chlorinated butyl rubber.

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

The halogenated elastomer useful as the secondary rubber in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber. In one embodiment, the halogenated butyl rubber is brominated butyl rubber, and in another embodiment is chlorinated butyl rubber.

The halogenated rubber component of the present invention includes, but is not limited to, brominated butyl rubber, chlorinated butyl rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In another embodiment, the halogenated butyl or star-branched butyl rubber used as the secondary rubber component may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963, 4,649,178, and 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

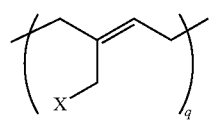

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber used as the secondary rubber component of the present invention is Bromobutyl 2222 (ExxonMobil Chemical Company, Houston, TX). Its Mooney viscosity is from 27 to 37 (ML 1+8 at 125° C., ASTM 1646), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 18 dN·m (ASTM D2084). Another commercial embodiment of the halogenated butyl rubber used as the secondary rubber component is Bromobutyl 2255 (ExxonMobil Chemical Company, Houston, TX). Its Mooney viscosity is from 41 to 51 (ML 1+8 at 125° C., ASTM 1646), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084). The invention is not limited to the commercial source of any of the halogenated rubber components.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, air spring sleeves, and automotive (including truck, commercial and/or passenger) or aircraft innerliners and innertubes. Other useful goods that can be made using compositions of the invention include hoses, seals, belts, molded goods, cable housing, and other articles disclosed in THE VANDERBILT RUBBER HANDBOOK, p 637-772 (R. F. Ohm, ed., R. T. Vanderbilt Company, Inc. 1990).

Suitable elastomeric compositions for such articles as air barriers, and more particularly tire curing bladders, innerliners, tire innertubes, and air sleeves, including gaskets and ring structures, were prepared by using conventional mixing techniques such as with a Banbury™ mixer. The sequence of mixing and temperatures employed are well known to the skilled rubber compounder, the objective being the dispersion of fillers, activators and curatives in the polymer matrix without excessive heat buildup.

A useful mixing procedure utilizes the Banbury™ mixer with tangential rotors in which the elastomer and additional components, such as carbon black, clay, or plasticizer, are added and the composition mixed for the desired time or to a particular temperature to achieve adequate dispersion of the ingredients. Mixing is performed at temperatures in the range from the melting point of the elastomer and/or any secondary rubber used in the composition in one embodiment, from 40° C. up to 250° C. in another embodiment, and from 100° C. to 200° C. in yet another embodiment. Typically, from 70% to 100% of the elastomer or elastomers is first mixed for 20 to 90 seconds, or until the temperature reaches from 40° C. to 75° C. Then, ¾ of any filler, and the remaining amount of elastomer, if any, are typically added to the mixer, and mixing continues until the temperature reaches from 90° C. to 150° C. Next, any remaining filler is added, as well as the processing aid, and mixing continues until the temperature reaches from 140° C. to 190° C. The masterbatch mixture is then finished by sheeting on an open mill and allowed to cool, for example, to from 60° C. to 100° C. when the curatives are added.

If the compounded rubber is to be used as an innerliner for a tire, innerliner stock is then prepared by calendaring the compounded rubber into a sheet material having a thickness of roughly 1 to 2 mm (40 to 80 mil gauge) and cutting the sheet material into strips of appropriate width for innerliner applications. The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. A pneumatic tire is a layered laminate having an outer surface which includes the tread and sidewall elements, belt reinforcing layers radially inward of the tread, an intermediate carcass structure which comprises a number of plies containing tire reinforcing fibers, (e.g., rayon, polyester, nylon or metal fibers) embedded in a rubbery matrix with the ends thereof typically turned about a pair of non-extensible bead rings, and an innerliner which is laminated to the inner surface of the carcass structure. Tires are normally built on a tire building drum, in either a single or two stage building process. After the uncured green tire has been assembled, the uncured tire is placed in a heated mold having an inflatable bladder that expands into the interior of the tire and contacts the tire innerliner. The tire is then heated to vulcanization temperatures to cure the tire. Vulcanization temperatures generally range from about 100° C. to about 250° C., more preferably from 125° C. to 200° C., and times may range from about one minute to several hours, more preferably from about 5 to 30 minutes for passenger car tires. Vulcanization time and temperature is dependent on multiple factors, including tire size, thickness of the tire, and the elastomers used in the tire. Vulcanization of the assembled tire results in vulcanization of the elastomeric elements of the tire assembly and enhances the adhesion between these elements, resulting in a cured, unitary tire.

OTHER EMBODIMENTS

In an embodiment A of the invention, disclosed is a composition comprising a halobutyl rubber and an isobutylene component.

In an embodiment B of the invention, disclosed is the composition of embodiment A wherein the halobutyl rubber is bromobutyl.

In an embodiment C of the invention, disclosed is the composition of embodiments A-B, wherein the composition is substantially free of a diolefin component.

In an embodiment D of the invention, disclosed is the composition of embodiments A-C, wherein the halobutyl rubber is present in the amount of less than or equal to about 30 wt % based on the composition and the isobutylene component is present in the amount of less than or equal to about 70 wt % based on the composition.

In an embodiment E of the invention, disclosed is a composition comprising a halobutyl rubber and a para-methyl-styrene component.

In an embodiment F of the invention, disclosed is the composition of embodiment E, wherein the halobutyl rubber is bromobutyl.

Example 1

In Example 1, the inventors evaluated composition and article properties having comparative polymers and butyl terpolymers (each with a paramethylstyrene content at or above 10 wt %). Table 1 provides the properties of two butyl terpolymers A and B. Both were prepared by copolymerizing three monomers: isobutylene, paramethylstyrene, and isoprene in the presence of EASC/EADC/DEAC catalyst at −95° C. The catalyst feed rate and feed flow rate differed, but the monomer ratio in the feed was the same. Table 2 also provides properties of butyl copolymer C and D. Copolymer C has only isobutylene and paramethylene styrene (i.e., no isoprene) and copolymer D has only isobutylene and isoprene (i.e., no paramethylstyrene). Table 2 provides composition properties of 4 comparative compositions (1-1 to 1-4) and 3 inventive compositions (1-5 to 1-7) having one of the inventive terpolymers of Table 1.

TABLE 1

| | Terpolymer and Copolymer Properties | | | | | | |
|---|---|---|---|---|---|---|---|
| Reaction Conditions | Butyl Terpolymer A | Butyl Terpolymer B | Butyl Copolymer C | Butyl Copolymer D | Butyl Copolymer E | Butyl Copolymer F | Butyl Copolymer G |
| HCl Initiator | 2.75 | 2.75 | | | | | |
| Lewis Acid: EASC/EADC/DEAC | EASC | EASC | EASC | EASC | EASC | EASC | EASC |
| Al/HCl mole ratio | 16.65 | 16.65 | | | | | |
| Conversion | 66.6 | 66.25 | | | | | |
| Feed flow rate (ml/min) | 7.73 | 9.06 | | | | | |

TABLE 1-continued

Terpolymer and Copolymer Properties

| Reaction Conditions | Butyl Terpolymer A | Butyl Terpolymer B | Butyl Copolymer C | Butyl Copolymer D | Butyl Copolymer E | Butyl Copolymer F | Butyl Copolymer G |
|---|---|---|---|---|---|---|---|
| Cat flow rate (ml/min) | 1.48 | 2.34 | | | | | |
| Monomer ratio in the feed (IB:pMS:IP) | 85.12:12.5:2.38 | 85.12:12.5:2.38 | | | | | |
| pMS wt % FT-IR | 13.56 | 13.77 | | | 5.0 | 0 | |
| pMS wt % FT-IR (repeat) | 11.94 | 12.59 | | | | | |
| pMS mol %/wt % by NMR | 5.10/9.06 | 5.07/9.01 | 10 wt % | 0 | | 0 | 0 |
| Isoprene, mol %/wt % by NMR | 0.99/1.14 | 1.08/1.25 | 0 | 2.3 mol % | | 1.05 mol % | 1.7 mol % |
| Mooney ML(1 + 8) at 125° C., MU | 34.3 | 26.6 | 33.6 | 33.0 | 35.0 | 32.0 | 51.0 |
| Mn, g/mol | 113900 | 112200 | | | | | |
| Mw, g/mol | 356900 | 329400 | | | | | |
| Mz, g/mol | 702500 | 653800 | | | | | |
| Mw/Mn | 3.134 | 2.935 | | | | | |

TABLE 2

Composition Properties

| Example No. | 1-1 | 1-2 | 1-3 | 1-4 | 1-5 | 1-6 | 1-7 |
|---|---|---|---|---|---|---|---|
| Density [kg/l] | 1.128 | 1.123 | 1.151 | 1.151 | 1.151 | 1.130 | 1.151 |
| BUTYL 065 | 100.00 | 100.00 | 100.00 | | | | |
| N330 | 50.00 | 50.00 | | | | 50.00 | |
| STEARIC ACID 5016NF | 1.00 | 1.00 | 1.00 | 1.00 | 1.00 | 1.00 | 1.00 |
| NEOPRENE W | | 5.00 | | | | 5.00 | |
| Calsol 875 | | 5.00 | 8.00 | 8.00 | 8.00 | | 8.00 |
| N660 | | | 60.00 | 60.00 | 60.00 | | 60.00 |
| ESCOREZ 1102 | | | 3.00 | 3.00 | 3.00 | | 3.00 |
| Butyl 365 | | | | 50.00 | | | |
| EXXPRO 1603 | | | | 50.00 | | | |
| Butyl Terpolymer A | | | | | 100.00 | | |
| Butyl Terpolymer B + 38 g Butyl Copolymer D | | | | | | 100 | |
| 20 grams of Butyl Terpolymer A + 20 grams of Butyl Terpolymer B + 300 grams of Butyl Copolymer C | | | | | | | 100.00 |
| Multipass level | 151.00 | 161.00 | 172.00 | 172.00 | 172.00 | 156.00 | 172.00 |
| KADOX 911 | 3.00 | 5.00 | 5.00 | 5.00 | 5.00 | 5.00 | 5.00 |
| METHYL TUADS | 1.00 | | 1.00 | 1.00 | 1.00 | | 1.00 |
| SULFUR(RUBBERMAKER | 1.75 | | 2.00 | 2.00 | 2.00 | | 2.00 |
| SP-1045 | | 10.00 | | | | 10.00 | |
| ALTAX, MBTS | | | 0.50 | 0.50 | 0.50 | | 0.50 |
| Total phr | 156.75 | 176.00 | 180.50 | 180.50 | 180.50 | 171.00 | 180.50 |
| Mooney ML(1 + 8) + Stress Relax | | | | | | | |
| Test temp [° C.] | 100 | 100 | 100 | 100 | 100 | 100 | 100 |
| Test time [min.] | 8.0 | 8.0 | 8.0 | 8.0 | 8.0 | 8.0 | 8.0 |
| Preheat [min.] | 1.0 | 1.0 | 1.0 | 1.0 | 1.0 | 1.0 | 1.0 |
| Decay [min.] | 1.0 | 1.0 | 1.0 | 1.0 | 1.0 | 1.0 | 1.0 |
| Mm [MU] | 80.90 | 60.80 | 58.10 | 71.20 | 36.40 | 31.60 | 66.70 |
| tMm [min.] | 8.00 | 7.97 | 7.95 | 5.40 | 8.00 | 8.00 | 4.57 |
| Visc@4 min [MU] | 82.3 | 61.5 | 59.1 | 71.4 | 37.1 | 32.2 | 66.9 |
| Mooney Scorch on MV2000E | | | | | | | |
| Test temp [° C.] | 135.00 | 135.00 | 135.00 | 135.00 | 135.00 | 135.00 | 135.00 |
| Test time [min] | 60.00 | 60.00 | 60.00 | 60.00 | 60.00 | 60.00 | 60.00 |
| Preheat [min] | 1.00 | 1.00 | 1.00 | 1.00 | 1.00 | 1.00 | 1.00 |
| Mm [MU] | 28.70 | 22.80 | 19.80 | 32.60 | 9.60 | 10.30 | 28.90 |
| tMm [min.] | 7.00 | 8.25 | 6.42 | 1.50 | 8.17 | 7.00 | 1.05 |
| t1 [min.] | 9.87 | 16.78 | 9.33 | 2.23 | 12.23 | 12.28 | 1.58 |
| t2 [min.] | 11.20 | 33.15 | 10.67 | 2.62 | 13.95 | 54.10 | 1.85 |

TABLE 2-continued

| | Composition Properties | | | | | | |
|---|---|---|---|---|---|---|---|
| Example No. | 1-1 | 1-2 | 1-3 | 1-4 | 1-5 | 1-6 | 1-7 |
| t3 [min.] | 12.15 | 45.70 | 11.67 | 2.95 | 15.07 | " | 2.02 |
| t5 [min.] | 13.43 | " | 13.10 | 3.48 | 16.40 | " | 2.29 |
| t10 [min.] | 15.18 | " | 14.95 | 4.36 | 18.03 | " | 2.72 |
| t35 [min.] | 16.41 | " | 16.10 | 5.29 | 19.67 | " | 3.08 |
| Curerate 1 | 0.75 | 0.06 | 0.75 | 2.61 | 0.58 | 0.02 | 3.75 |
| | MDR (time: 10 min. intervals) | | | | | | |
| Test Time [Min] | 30 | 30 | 30 | 30 | 30 | 30 | 30 |
| Test Temp [° C.] | 160 | 160 | 160 | 160 | 160 | 160 | 160 |
| Osc. angle [Deg.] | 0.5 | 0.5 | 0.5 | 0.5 | 0.5 | 0.5 | 0.5 |
| ML [dNm] | 2.90 | 2.08 | 1.89 | 2.11 | 0.78 | 1.07 | 1.71 |
| MH [dNm] | 15.81 | 5.19 | 10.65 | 7.28 | 7.65 | 3.99 | 7.18 |
| MH − ML [dNm] | 12.91 | 3.11 | 8.76 | 5.17 | 6.87 | 2.92 | 5.47 |
| t10 [Min] | 3.05 | 1.31 | 2.88 | 0.89 | 3.42 | 0.71 | 0.70 |
| t90 [Min] | 19.97 | 26.26 | 21.91 | 14.11 | 21.61 | 23.57 | 4.56 |
| PeakRate [dNm/min] | 2.27 | 0.44 | 1.23 | 2.01 | 0.99 | 0.76 | 4.02 |
| PeakTime [Min] | 4.19 | 0.68 | 3.70 | 1.49 | 4.13 | 0.48 | 1.08 |
| tMH [Min] | 30.00 | 30.00 | 29.99 | 29.99 | 29.99 | 29.99 | 30.00 |
| | MDR (time: 10 min. intervals) | | | | | | |
| Test Time [Min] | 15 | 15 | 15 | 15 | 15 | 15 | 15 |
| Test Temp [° C.] | 180 | 180 | 180 | 180 | 180 | 180 | 180 |
| Osc. angle [Deg.] | 0.5 | 0.5 | 0.5 | 0.5 | 0.5 | 0.5 | 0.5 |
| ML [dNm] | 2.24 | 1.91 | 1.55 | 1.80 | 0.75 | 1.09 | 1.34 |
| MH [dNm] | 13.67 | 6.15 | 9.81 | 7.16 | 7.23 | 4.49 | 6.55 |
| MH − ML [dNm] | 11.43 | 4.24 | 8.26 | 5.36 | 6.48 | 3.40 | 5.21 |
| t10 [Min] | 1.11 | 0.97 | 1.03 | 0.53 | 1.22 | 0.55 | 0.43 |
| t90 [Min] | 6.75 | 12.85 | 6.95 | 5.32 | 6.80 | 11.23 | 2.51 |
| PeakRate [dNm/min] | 6.02 | 0.78 | 3.74 | 5.87 | 3.11 | 1.00 | 7.76 |
| PeakTime [Min] | 1.54 | 0.78 | 1.33 | 0.78 | 1.50 | 0.65 | 0.67 |
| tMH [Min] | 13.67 | 14.99 | 13.18 | 14.99 | 12.77 | 14.99 | 14.99 |
| | Hardness Shore A (Zwick) | | | | | | |
| 3 days 125° C. | | | | | | | |
| Test Delay (3 sec.) [sec.] | 3.0 | 3.0 | 3.0 | 3.0 | 3.0 | 3.0 | 3.0 |
| Test Temp. [° C.] | 23.0 | 23.0 | 23.0 | 23.0 | 23.0 | 23.0 | 23.0 |
| Hardness A [Shore A] | 63 | 76 | 67 | 62 | 69 | 88 | 59 |
| | Hardness Shore A (Zwick) | | | | | | |
| Test Delay (3 sec.) [sec.] | 3.0 | 3.0 | 3.0 | 3.0 | 3.0 | 3.0 | 3.0 |
| Test Temp. [° C.] | 23.0 | 23.0 | 23.0 | 23.0 | 23.0 | 23.0 | 23.0 |
| Hardness A [Shore A] | 58 | 55 | 59 | 52 | 56 | 56 | 53 |
| | Tensile 1000 Test 3 days 125° C. | | | | | | |
| 100Modulus [MPa] | 1.979 | 4.454 | 2.769 | 2.450 | 2.456 | 4.825 | 2.920 |
| 300Modulus [MPa] | 6.001 | 11.457 | 6.893 | 7.386 | 4.928 | 0.000 | 9.375 |
| EnergyToBreak [J] | 5.858 | 8.647 | 6.858 | 8.523 | 6.877 | 0.314 | 9.038 |
| StressAtBreak [MPa] | 10.987 | 16.384 | 10.677 | 11.831 | 7.285 | 4.930 | 13.623 |
| % StrainAtBreak [%] | 506.980 | 451.350 | 532.550 | 565.670 | 623.030 | 33.827 | 505.620 |
| | Tensile 1000 Test | | | | | | |
| 100Modulus [MPa] | 1.787 | 1.524 | 1.963 | 1.481 | 1.772 | 1.612 | 1.698 |
| 300Modulus [MPa] | 5.956 | 2.684 | 5.373 | 4.537 | 4.637 | 0.000 | 5.865 |
| EnergyToBreak [J] | 9.972 | 7.359 | 8.251 | 10.522 | 8.603 | 0.293 | 10.960 |
| StressAtBreak [MPa] | 15.135 | 9.074 | 11.544 | 10.986 | 9.268 | 1.636 | 11.678 |
| % StrainAtBreak [%] | 617.510 | 812.150 | 611.020 | 764.030 | 713.070 | 110.830 | 691.390 |

Example 2

In Example 2, the inventors evaluated composition and article properties having butyl copolymer E. Table 1 provides the properties of the butyl copolymer E, prepared by copolymerizing isobutylene and paramethylstyrene in the presence of EASC/EADC/DEAC catalyst at −95° C. Table 3 provides composition properties of formulations with butyl copolymer E (2-2 and 2-3) and comparative without copolymer E (2-1).

TABLE 3

| Composition Properties | | | |
|---|---|---|---|
| Example No. | 2-1 | 2-2 | 2-3 |
| Density [kg/l] | 1.139 | 1.122 | 1.130 |
| N660 | 60 | 60 | 60 |
| Calsol 875 | 8 | 8 | 8 |
| STEARIC ACID 5016NF | 1 | 1 | 1 |
| STRUKTOL 40 MS | 7 | 7 | 7 |
| ESCOREZ 1102 | 4 | 4 | 4 |
| Maglite K | 0.15 | 0.15 | 0.15 |
| EXXPRO 03-1 | 100 | 0 | 50 |
| Butyl Copolymer E | | 100 | 50 |
| Multipass level | 180.15 | 180.15 | 180.15 |
| KADOX 911 | 1 | 1 | 1 |
| ALTAX, MBTS | 1.25 | 1.25 | 1.25 |
| SULFUR(RUBBERMAKER | 0.5 | 0.5 | 0.5 |
| Total phr | 182.9 | 182.9 | 182.9 |
| Mooney ML (1 + 8) + Stress Relax | | | |
| Test temp [° C.] | 100 | 100 | 100 |
| Test time [min.] | 8 | 8 | 8 |
| Preheat [min.] | 1 | 1 | 1 |
| Decay [min.] | 2 | 2 | 2 |
| Mm [MU] | 54.47 | 59.28 | 56.81 |
| tMm [min.] | 6.63 | 7.12 | 6.60 |
| Visc @ 4 min [MU] | 54.9 | 60.0 | 57.5 |
| Mooney Scorch at 125° C. | | | |
| Test temp [° C.] | 125 | 125 | 125 |
| Test time [min] | 60 | 60 | 60 |
| Preheat [min] | 1 | 1 | 1 |
| Mm [MU] | 21.66 | 24.18 | 23.15 |
| tMm [min.] | 5.58 | 5.90 | 5.85 |
| t1 [min.] | 22.45 | 23.61 | 28.56 |
| t2 [min.] | 50.61 | 46.98 | 56.73 |
| Curerate 1 | 0.04 | 0.04 | 0.04 |
| MDR times 10s | | | |
| Test Time [Min] | 60 | 60 | 60 |
| Test Temp [° C.] | 160 | 160 | 160 |
| Osc. angle [Deg.] | 0.5 | 0.5 | 0.5 |
| ML [dNm] | 1.25 | 1.48 | 1.35 |
| MH [dNm] | 6.35 | 6.38 | 6.35 |
| MH − ML [dNm] | 5.10 | 4.90 | 5.00 |
| t10 [Min] | 5.10 | 5.42 | 5.34 |
| t90 [Min] | 35.88 | 39.05 | 33.34 |
| PeakRate [dNm/min] | 0.28 | 0.25 | 0.28 |
| PeakTime [Min] | 12.63 | 13.29 | 14.16 |
| tMH [Min] | 59.95 | 59.93 | 59.99 |
| Test Time [Min] | 30 | 30 | 30 |
| Test Temp [° C.] | 160 | 160 | 160 |
| Osc. angle [Deg.] | 0.5 | 0.5 | 0.5 |
| ML [dNm] | 1.28 | 1.47 | 1.33 |
| MH [dNm] | 5.75 | 5.56 | 5.79 |
| MH − ML [dNm] | 4.47 | 4.09 | 4.46 |
| t10 [Min] | 4.25 | 4.10 | 4.83 |
| t90 [Min] | 24.88 | 25.08 | 24.62 |
| PeakRate [dNm/min] | 0.29 | 0.26 | 0.31 |
| PeakTime [Min] | 11.90 | 13.30 | 13.58 |
| tMH [Min] | 29.96 | 30.00 | 29.98 |
| Hardness Shore A | | | |
| Test Delay (3 sec.) [sec.] | 3 | 3 | 3 |
| Test Temp. [° C.] | 23 | 23 | 23 |
| Hardness A [Shore A] | 58 | 54 | 57 |
| Tensile 1000, Aged 3 days at 125° C. | | | |
| 100Modulus [MPa] | 3.07 | 2.40 | 2.80 |
| 300Modulus [MPa] | 8.58 | 7.66 | 7.80 |
| Tensile 1000 | | | |
| 100Modulus [MPa] | 1.52 | 1.28 | 1.36 |
| 300Modulus [MPa] | 4.96 | 4.51 | 4.43 |
| EnergyToBreak [J] | 8.55 | 12.69 | 10.18 |
| StressAtBreak [MPa] | 9.12 | 9.56 | 8.72 |
| % StrainAtBreak [%] | 700.7 | 777.3 | 690.8 |

Example 3

In Example 3, the inventors evaluated composition and article properties having comparative polymers and bimodal butyl copolymers (having a halogenated butyl rubber and another butyl rubber). Halobutyl elastomers with functional bromine content of 1.03 mol % were prepared in a second reactor. The two were combined in varying ratios and used for preparing tire inner liner compounds. The inner liner compounds were studied under normal and accelerated aging conditions. Tables 4-6 show 14 different compositions having varying amounts of inventive polymers (BIIR 2255 and Vistanex MML 120, BIIR 2222 and Vistanex MML 120, BIIR 2255 and Exxpro, and BIIR 222 and Exxpro). Various properties of the resultant formulations were evaluated and are also reported in Tables 4-6. Butyl elastomers with isoprene content of about 1.7 mol % were prepared in a reactor. Surprisingly, it was found that inner liners made from the mixture of elastomers showed enhanced properties than the compounds made out of individual elastomers. The dissimilar crosslinking rate and dissimilar network structure and crosslink density differences may be responsible for the enhancement in properties.

TABLE 4

| Tire inner-liner properties | | | | | |
|---|---|---|---|---|---|
| Example No. | 3-1 | 3-2 | 3-3 | 3-4 | 3-5 |
| BIIR 255 | 100.00 | 95.00 | 90.00 | 85.00 | 80.00 |
| Carbon Black N 660 | 60.00 | 60.00 | 60.00 | 60.00 | 60.00 |
| Napthanic Oil (IPOL 501) | 8.00 | 8.00 | 8.00 | 8.00 | 8.00 |
| STRUKTOL 40MS HOMOGENIZING | 7.00 | 7.00 | 7.00 | 7.00 | 7.00 |
| Escorez 1102 | 4.00 | 4.00 | 4.00 | 4.00 | 4.00 |
| STEARIC ACID | 1.00 | 1.00 | 1.00 | 1.00 | 1.00 |
| Vistanex MML 120 | — | 5.00 | 10.00 | 15.00 | 20.00 |

TABLE 4-continued

| Tire inner-liner properties | | | | | |
|---|---|---|---|---|---|
| Example No. | 3-1 | 3-2 | 3-3 | 3-4 | 3-5 |
| BIIR 2222 - BR | — | — | — | — | — |
| Exxpro Backbone XP 50 | — | — | — | — | — |
| Cure Package | | | | | |
| Zinc Oxide | 1.00 | 1.00 | 1.00 | 1.00 | 1.00 |
| MBTS | 1.25 | 1.25 | 1.25 | 1.25 | 1.25 |
| SULFUR (RUBBERMAKERS-90) | 0.50 | 0.50 | 0.50 | 0.50 | 0.50 |
| Total phr | 182.75 | 182.75 | 182.75 | 182.75 | 182.75 |
| Mooney ML(1 + 8) + Stress Relax @ 100° C. | | | | | |
| Mm [MU] | 57.40 | 60.70 | 63.70 | 65.70 | 65.10 |
| ML(1 + 4) [MU] | 58.60 | 61.80 | 64.70 | 66.40 | 65.50 |
| Mooney Scorch @ 125° C. on MV2000 | | | | | |
| t10 [min] | 45.65 | 44.18 | 40.88 | 36.47 | 31.83 |
| t35 [min] | 56.84 | 55.20 | 53.44 | 52.82 | 53.72 |
| MDR at 160° C. | | | | | |
| ML[dNm] | 1.88 | 2.03 | 2.12 | 2.23 | 2.30 |
| MH [dNm] | 6.10 | 6.14 | 5.77 | 5.62 | 5.40 |
| MH − ML [dNm] | 4.22 | 4.11 | 3.65 | 3.39 | 3.10 |
| t90 [min] | 12.37 | 11.84 | 11.75 | 11.23 | 10.40 |
| Peak Rate [dNm/min] | 0.48 | 0.48 | 0.44 | 0.40 | 0.39 |
| Peak Time [min] | 6.43 | 6.17 | 5.57 | 5.90 | 5.56 |
| Hardness Shore A (Wallace) (Cured at tc90 + 2 @ 160° C. MDR) | | | | | |
| Original [Shore A] | 39 | 39 | 38 | 39 | 38 |
| Aged/125° C./72 hrs [Shore A] | 55 | 54 | 54 | 54 | 53 |
| Aged/125° C./168 hrs [Shore A] | 57 | 56 | 56 | 55 | 55 |
| Die B Tear (Cured at tc90 + 2 @ 160° C. MDR) | | | | | |
| Tear Resistance Original [N/mm] | 35.31 | 33.54 | 33.57 | 29.42 | 33.09 |
| ASTM DUMBELL TENSILE (Cured at tc90 + 2 @ 160° C. MDR) | | | | | |
| Original | | | | | |
| 100% Modulus [MPa] | 0.95 | 1.10 | 0.89 | 1.00 | 0.90 |
| Tensile at Break [MPa] | 9.48 | 9.67 | 8.33 | 8.41 | 8.12 |
| Elongation at Break [%] | 760 | 710 | 770 | 740 | 810 |
| Energy at Break [J] | 10.01 | 9.21 | 9.27 | 8.79 | 8.83 |
| Aged/3.0 days/125° C. | | | | | |
| 100% Modulus [MPa] | 2.12 | 2.03 | 1.99 | 2.03 | 2.04 |
| Tensile at Break [MPa] | 8.03 | 7.70 | 7.44 | 7.95 | 8.41 |
| Elongation at Break [%] | 510 | 540 | 560 | 570 | 590 |
| Energy at Break [J] | 7.49 | 7.80 | 7.96 | 8.28 | 8.23 |
| Aged/7.0 days/125° C. | | | | | |
| 100% Modulus [MPa] | 2.25 | 2.21 | 2.35 | 2.29 | 2.28 |
| Tensile at Break [MPa] | 7.02 | 6.59 | 6.70 | 7.49 | 7.51 |
| Elongation at Break [%] | 420 | 420 | 410 | 490 | 520 |
| Energy at Break [J] | 5.31 | 5.16 | 5.17 | 6.73 | 7.19 |
| DeMattia Crack Growth (Cured at tc90 + 5 @ 160° C. MDR) | | | | | |
| Original | | | | | |
| KC-1(avg) [mm] | 2.5 | 2.2 | 2.3 | 2.4 | 2.6 |
| KC-60(avg) [mm] | 6.0 | 3.7 | 5.8 | 3.7 | 4.0 |
| KC180(avg) [mm] | 12.0 | 5.1 | 11.3 | 5.8 | 5.3 |
| KC200(avg) [mm] | 12.7 | 5.2 | 12.6 | 6.1 | 5.7 |
| Aged/3.0 days/125° C. | | | | | |
| KC-1 (avg) [mm] | 2.1 | 2.1 | 2.2 | 2.1 | 2.1 |
| KC-60(avg) [mm] | 5.7 | 5.3 | 4.2 | 4.5 | 4.9 |
| KC180(avg) [mm] | 9.4 | 8.4 | 6.5 | 6.7 | 7.1 |
| KC200(avg) [mm] | 10.7 | 9.1 | 6.7 | 6.9 | 7.4 |

TABLE 4-continued

| | Tire inner-liner properties | | | | |
|---|---|---|---|---|---|
| Example No. | 3-1 | 3-2 | 3-3 | 3-4 | 3-5 |

| Fatigue to Failure Test (Cured at tc90 + 2 @ 160° C. MDR) (8 specimen tested) | | | | | |
|---|---|---|---|---|---|
| Aged/1.0 days/125° C. | CAM 24, 136% Extension, Test Temperature: Room Temperature (i.e. 23 ± 2° C.) | | | | |
| Avg. KC's [K-Cycles] | 39.9 | 87.0 | 100.5 | 97.6 | 136.3 |
| Fatigue to Failure Test (Cured at tc90 + 2 @ 160° C. MDR) (8 specimen tested) | | | | | |
| Aged/3.0 days/125° C. | CAM 24, 136% Extension, Test Temperature: Room Temperature (i.e. 23 ± 2° C.) | | | | |
| Avg. KC's [K-Cycles] | 79.6 | 87.3 | 111.8 | 88.1 | 133.4 |
| MOCON $O_2$ Permeability Test (Cured at tc90 + 2 @ 160° C. MDR) | | | | | |
| Test Temp. [° C.] | 40 | 40 | 40 | 40 | 40 |
| Permeation [cc*mm/m$^2$*day] | 157.4 | 139.6 | 158.3 | 172.2 | 158.0 |
| Permeability Coefficient [cc*mm/m$^2$*day*mmHg] | 0.234 | 0.208 | 0.235 | 0.256 | 0.235 |
| Permeance Coefficient [cc/m$^2$*day*mmHg] | 0.467 | 0.413 | 0.476 | 0.516 | 0.476 |

TABLE 5

| | Tire inner-liner properties Series 4 mixtures | | | | |
|---|---|---|---|---|---|
| Example No. | 3-6 | 3-7 | 3-8 | 3-9 | 3-10 |
| BIIR 2255 | — | — | — | — | — |
| Carbon Black N 660 | 60.00 | 60.00 | 60.00 | 60.00 | 60.00 |
| Napthanic Oil (IPOL 501) | 8.00 | 8.00 | 8.00 | 8.00 | 8.00 |
| STRUKTOL 40MS HOMOGENIZING | 7.00 | 7.00 | 7.00 | 7.00 | 7.00 |
| Escorez 1102 | 4.00 | 4.00 | 4.00 | 4.00 | 4.00 |
| STEARIC ACID | 1.00 | 1.00 | 1.00 | 1.00 | 1.00 |
| Vistanex MML 120 | — | 5.00 | 10.00 | 15.00 | 20.00 |
| BIIR 2222 - BR | 100.00 | 95.00 | 90.00 | 85.00 | 80.00 |
| Exxpro Backbone XP 50 | — | — | — | — | — |
| Final | Multipass Level 180 | | | | |
| Zinc Oxide | 1.00 | 1.00 | 1.00 | 1.00 | 1.00 |
| MBTS | 1.25 | 1.25 | 1.25 | 1.25 | 1.25 |
| SULFUR (RUBBERMAKERS-90) | 0.50 | 0.50 | 0.50 | 0.50 | 0.50 |
| Total phr lab | 182.75 | 182.75 | 182.75 | 182.75 | 182.75 |
| Mooney ML(1 + 8) + Stress Relax | | | | | |
| Mm [MU] | 52.70 | 53.50 | 47.50 | 56.90 | 58.30 |
| ML(1 + 4) at 100C [MU] | 53.60 | 54.40 | 56.30 | 57.60 | 58.80 |
| Mooney Scorch @ 125° C. on MV2000 | | | | | |
| t5 [min] | 47.97 | 48.22 | 47.77 | 47.57 | 47.98 |
| t10 [min] | 54.97 | 55.40 | 55.08 | 55.15 | 55.47 |
| t20 [min] | 60.13 | 60.45 | 59.80 | 59.83 | 59.53 |
| t35 [min] | — | — | — | — | — |
| MDR at 160° C. | | | | | |
| ML [dNm] | 1.39 | 1.49 | 1.62 | 1.75 | 1.88 |
| MH [dNm] | 5.48 | 5.33 | 5.24 | 5.09 | 5.16 |
| MH – ML [dNm] | 4.09 | 3.84 | 3.62 | 3.34 | 3.28 |
| t90 [min] | 11.17 | 10.58 | 10.43 | 10.04 | 10.16 |
| Peak Rate [dNm/min] | 0.56 | 0.54 | 0.51 | 0.47 | 0.45 |
| Peak Time [min] | 5.29 | 5.78 | 5.64 | 5.21 | 5.55 |
| Hardness Shore A (Wallace) | | | | | |
| Original [Shore A] | 38 | 40 | 37 | 38 | 36 |
| Aged/3.0 days/125° C. [Shore A] | 58 | 57 | 54 | 54 | 55 |
| Aged/7.0 days/125° C. [Shore A] | 60 | 58 | 57 | 58 | 56 |
| Die B Tear | | | | | |
| Tear Resistance Original [N/mm] | 32.06 | 29.64 | 34.93 | 23.17 | 30.22 |

TABLE 5-continued

Tire inner-liner properties
Series 4 mixtures

| Example No. | 3-6 | 3-7 | 3-8 | 3-9 | 3-10 |
|---|---|---|---|---|---|
| ASTM DUMBELL TENSILE | | | | | |
| *Original* | | | | | |
| 100% Modulus [MPa] | 0.92 | 1.02 | 0.89 | 0.90 | 0.69 |
| Tensile at Break [MPa] | 8.65 | 9.36 | 7.63 | 8.22 | 5.18 |
| Elongation at Break [%] | 790 | 770 | 800 | 830 | 910 |
| Energy at Break [J] | 9.68 | 10.79 | 9.03 | 9.82 | 7.08 |
| Aged/3.0 days/125° C. | | | | | |
| 100% Modulus [MPa] | 2.05 | 1.98 | 2.02 | 1.98 | 1.87 |
| Tensile at Break [MPa] | 7.95 | 7.65 | 7.86 | 7.48 | 7.84 |
| Elongation at Break [%] | 550 | 560 | 580 | 600 | 620 |
| Energy at Break [J] | 7.47 | 7.64 | 7.93 | 8.43 | 8.76 |
| Aged/7.0 days/125° C. | | | | | |
| 100% Modulus [MPa] | 2.47 | 2.21 | 2.24 | 2.30 | 2.22 |
| Tensile at Break [MPa] | 7.58 | 6.90 | 7.04 | 7.21 | 6.89 |
| Elongation at Break [%] | 490 | 490 | 490 | 520 | 510 |
| Energy at Break [J] | 6.81 | 6.31 | 6.39 | 7.14 | 6.82 |
| DeMattia Crack Growth | | | | | |
| *Original* | | | | | |
| KC-1(avg) [mm] | 2.4 | 2.25 | 2.25 | 2.2 | 2.5 |
| KC-60(avg) [mm] | 6.9 | 3.3 | 3.5 | 3.4 | 3.4 |
| KC-80(avg) [mm] | 7.8 | 3.5 | 3.6 | 3.5 | 3.5 |
| KC180(avg) [mm] | 12.9 | 4.0 | 4.2 | 4.1 | 4.1 |
| KC200(avg) [mm] | 14.4 | 4.5 | 4.3 | 4.3 | 4.4 |
| Aged/3.0 days/125° C. | | | | | |
| KC-1(avg) [mm] | 2.1 | 2.1 | 2.2 | 2.3 | 2.2 |
| KC-60(avg) [mm] | 5.7 | 4.4 | 4.1 | 4.6 | 4.6 |
| KC-80(avg) [mm] | 6.6 | 4.7 | 4.7 | 5.0 | 4.9 |
| KC180(avg) [mm] | 9.9 | 6.5 | 6.4 | 6.7 | 6.7 |
| KC200(avg) [mm] | 11.0 | 6.7 | 6.7 | 6.9 | 7.0 |
| Fatigue to Failure Test, CAM 24, 136% Extension, Test Temp: Room Temperature 23 ± 2° C. (8 Specimen Tested) | | | | | |
| Aged/1.0 days/125° C. | | | | | |
| Avg. KC's [K-Cycles] | 61.4 | 96.5 | 124.9 | 142.8 | 136.2 |
| Aged/3.0 days/125° C. | | | | | |
| Avg. KC's [K-Cycles] | 53.9 | 111.2 | 61.6 | 110.3 | 145.7 |
| MOCON $O_2$ Permeability Test | | | | | |
| Test Temp. [° C.] | 40 | 40 | 40 | 40 | 40 |
| Permeation [cc*mm/m²*day] | 171.2 | 170.9 | 190.8 | 167.2 | 163.6 |
| Permeability Coefficient [cc*mm/m²*day*mmHg] | 0.255 | 0.253 | 0.282 | 0.248 | 0.243 |
| Permeance Coefficient [cc/m²*day*mmHg] | 0.509 | 0.509 | 0.549 | 0.502 | 0.473 |

TABLE 6

Tire inner-liner properties
Series 5 mixtures

| Example No. | 3-11 | 3-12 | 3-13 | 3-14 |
|---|---|---|---|---|
| BIIR 2255 | 100.00 | — | 90.00 | — |
| Carbon Black N 660 | 60.00 | 60.00 | 60.00 | 60.00 |
| Napthanic Oil (IPOL 501) | 8.00 | 8.00 | 8.00 | 8.00 |
| STRUKTOL 40MS HOMOGENIZING | 7.00 | 7.00 | 7.00 | 7.00 |
| Escorez 1102 | 4.00 | 4.00 | 4.00 | 4.00 |

TABLE 6-continued

Tire inner-liner properties
Series 5 mixtures

| Example No. | 3-11 | 3-12 | 3-13 | 3-14 |
|---|---|---|---|---|
| STEARIC ACID | 1.00 | 1.00 | 1.00 | 1.00 |
| Vistanex MML 120 | — | — | — | — |
| BIIR 2222 - BR | — | 100.00 | — | 90.00 |
| Exxpro Backbone XP 50 | — | — | 10.00 | 10.00 |
| Final | | | | |
| Multipass level | 180.00 | 180.00 | 180.00 | 180.00 |
| Zinc Oxide | 1.00 | 1.00 | 1.00 | 1.00 |
| MBTS | 1.25 | 1.25 | 1.25 | 1.25 |
| SULFUR (RUBBERMAKERS-90) | 0.50 | 0.50 | 0.50 | 0.50 |
| Total phr lab | 182.75 | 182.75 | 182.75 | 182.75 |
| Mooney ML(1 + 8) + Stress Relax | | | | |
| Mm [MU] | 57.40 | 52.70 | 58.30 | 52.80 |
| ML(1 + 4) at 100C [MU] | 58.60 | 53.60 | 59.30 | 53.30 |
| Mooney Scorch @ 125° C. on MV2000 | | | | |
| t5 [min] | 38.55 | 47.97 | 38.97 | 48.17 |
| t10 [min] | 45.65 | 54.97 | 46.23 | 55.85 |
| t20 [min] | 52.17 | 60.13 | 52.62 | — |
| MDR at 160° C. | | | | |
| ML [dNm] | 1.88 | 1.39 | 1.83 | 1.36 |
| MH [dNm] | 6.10 | 5.48 | 5.18 | 4.93 |
| MH – ML [dNm] | 4.22 | 4.09 | 3.35 | 3.57 |
| t90 [min] | 12.37 | 11.17 | 11.35 | 10.84 |
| Peak Rate [dNm/min] | 0.48 | 0.56 | 0.41 | 0.47 |
| Peak Time [min] | 6.43 | 5.29 | 5.25 | 5.51 |
| Hardness Shore A (Wallace) | | | | |
| Original [Shore A] | 39 | 38 | 39 | 40 |
| Aging/3.0 days/125° C. [Shore A] | 55 | 58 | 54 | 55 |
| Aged/7.0 days/125° C. [Shore A] | 57 | 60 | 54 | 58 |
| Die B Tear | | | | |
| Tear Resistance Original [N/mm] | 35.31 | 32.06 | 31.04 | 35.50 |
| ASTM DUMBELL TENSILE | | | | |
| Original | | | | |
| 100% Modulus [MPa] | 0.95 | 0.92 | 1.03 | 0.96 |
| Tensile at Break [MPa] | 9.48 | 8.65 | 9.35 | 8.36 |
| Elongation at Break [%] | 760 | 790 | 780 | 780 |
| Energy at Break [J] | 10.01 | 9.68 | 11.22 | 9.50 |
| Aged/3.0 days/125° C. | | | | |
| 100% Modulus [MPa] | 2.12 | 2.05 | 2.10 | 1.98 |
| Tensile at Break [MPa] | 8.03 | 7.95 | 7.90 | 7.67 |
| Elongation at Break [%] | 510 | 550 | 570 | 610 |
| Energy at Break [J] | 7.49 | 7.47 | 7.88 | 8.21 |
| Aged/7.0 days/125° C. | | | | |
| 100% Modulus [MPa] | 2.25 | 2.47 | 2.29 | 2.22 |
| Tensile at Break [MPa] | 7.02 | 7.58 | 7.40 | 6.90 |
| Elongation at Break [%] | 420 | 490 | 510 | 500 |
| Energy at Break [J] | 5.31 | 6.81 | 6.70 | 6.48 |
| DeMattia Crack Growth | | | | |
| Original | | | | |
| KC-1(avg) [mm] | 2.5 | 2.4 | 2.5 | 2.4 |
| KC-60(avg) [mm] | 6.0 | 6.9 | 3.3 | 3.3 |
| KC180(avg) [mm] | 12.0 | 12.9 | 5.2 | 4.5 |
| KC200(avg) [mm] | 12.7 | 14.4 | 5.4 | 4.9 |
| Aged/3.0 days/125° C. | | | | |
| KC-1(avg) [mm] | 2.1 | 2.1 | 2.1 | 2.1 |
| KC-60(avg) [mm] | 5.7 | 5.7 | 4.4 | 4.3 |

TABLE 6-continued

Tire inner-liner properties
Series 5 mixtures

| Example No. | 3-11 | 3-12 | 3-13 | 3-14 |
|---|---|---|---|---|
| KC180(avg) [mm] | 9.4 | 9.9 | 7.2 | 6.4 |
| KC200(avg) [mm] | 10.7 | 11.0 | 7.5 | 6.7 |
| Fatigue to Failure Test (8 Specimen Tested) | | | | |
| Aged/1.0 days/125° C. | CAM 24, 136% Extension, Testing Temp.: Room Temperature (i.e. 23 ± 2° C.) | | | |
| Avg. KC's [K-Cycles] | 39.9 | 61.4 | 68.4 | 102.1 |
| Aged/3.0 days/125° C. | CAM 24, 136% Extension, Testing Temp.: Room Temperature (i.e. 23 ± 2° C.) | | | |
| Avg. KC's [K-Cycles] | 79.6 | 53.9 | 76.6 | 124.0 |
| MOCON $O_2$ Permeability Test | | | | |
| Test Temp. [° C.] | 40 | 40 | 40 | 40 |
| Permeation [cc*mm/m$^2$*day] | 157.4 | 171.2 | 162.6 | 173.0 |
| Permeability Coefficient [cc*mm/m$^2$*day*mmHg] | 0.234 | 0.255 | 0.241 | 0.256 |
| Permeance Coefficient [cc/m$^2$*day*mmHg] | 0.467 | 0.509 | 0.484 | 0.495 |

Table 7 summarizes the test methods used to evaluate the compositions of the invention.

TABLE 7

Summary of Test Methods

| Property | Test Method[1] |
|---|---|
| Mooney ML (1 + 8) + Stress Relax | ASTM 1646 (exception-did not follow the ASTM reporting format) |
| Mooney Scorch @ 125° C. on MV2000 (60 min) | ASTM 1646 (exception-did not follow the ASTM reporting format) |
| MDR Times by 10's (60° C.) | ASTM D5289 (exception-did not condition the samples as in the Standard Interpretation of Results and reporting not done according to the standard) |
| MDR Times by 10's (180° C.) | ASTM D5289 (exception-did not condition the samples as in the Standard Interpretation of Results and reporting not done according to the standard) |
| Shore A Hardness (Wallace) Original 125° C./3 days 125° C./7 days | ASTM 2240 (exception-did not condition the samples as in the Standard) |
| Die B Tear | ASTM D 624 (exception-did not condition the samples as in the Standard) |
| Fatigue to Failure 125° C./1.0 day 125° C./3.0 days | ASTM D4482 |
| DeMattia Crack Growth 125° C./3.0 days | ASTM D 430 (exception-did not condition the samples as in the Standard Interpretation of Results and reporting not done according to the standard) |
| Mocon Oxygen Permeability Test | ASTM 3985; at 40° C. using 0.3 mm thick samples |

[1]unless otherwise stated, properties tested under laboratory conditions of 23 ± 2° C. with relative humidity of 50 ± 10%

All priority documents are herein fully incorporated by reference for all jurisdictions in which such incorporation is permitted. Further, all documents cited herein, including testing procedures, are herein fully incorporated by reference for all jurisdictions in which such incorporation is permitted.

The invention claimed is:

1. A terpolymer composition comprising:
   a. a $C_4$ to $C_7$ isoolefin;
   b. an alkylstyrene; and
   c. a diolefin, wherein the $C_4$ to $C_7$ isoolefin is not the same as the diolefin;
   wherein the $C_4$ to $C_7$ isoolefin is present in the terpolymer composition in an amount of less than or equal to about 90 wt % based on the terpolymer composition;
   wherein the alkylstyrene is present in the terpolymer composition in an amount of greater than or equal to about 10 wt % based on the terpolymer composition;
   wherein the diolefin is present in the terpolymer composition in an amount of less than or equal to about 10 wt % based on the terpolymer composition;
   wherein the terpolymer composition has a number average molecular weight in a range from 111,000 to 115,000 g/mol and a molecular weight distribution (Mw/Mn) of less than 3.2, and a z-average molecular weight (Mz) in a range from 653,800 to 702,500 g/mol; and
   wherein the terpolymer composition has a Mooney viscosity ML (1+8) at 125° C. of less than 27 or about 34.

2. The terpolymer composition of claim 1, wherein the $C_4$ to $C_7$ isoolefin is halogenated.

3. The terpolymer composition of claim 1, wherein the $C_4$ to $C_7$ isoolefin is halogenated with bromine.

4. The terpolymer composition of claim 1, wherein the alkylstyrene is halogenated.

5. The terpolymer composition of claim 1, wherein the alkylstyrene is paramethylstyrene.

6. The terpolymer composition of claim 5, wherein the paramethylstyrene is present in an amount of less than or equal to about 20 wt % based on the terpolymer composition.

7. The terpolymer composition of claim 1, wherein the diolefin is isoprene, butadiene, cyclopentadiene, or combinations thereof.

8. The terpolymer composition of claim 1, wherein the $C_4$ to $C_7$ isoolefin is isobutylene.

9. The terpolymer composition of claim 1, wherein the terpolymer composition has a molecular weight (Mw) in a range from 329,400 to 356,900 g/mol.

10. A process to make the terpolymer composition of claim 1, comprising the steps of
   a. polymerizing the $C_4$ to $C_7$ isoolefin, the alkylstyrene, and the diolefin; and
   b. recovering the terpolymer composition.

11. A composition comprising:
   a. an elastomer having
      i. a $C_4$ to $C_7$ isoolefin;
      ii. an alkylstyrene;
      iii. a diolefin, wherein the $C_4$ to $C_7$ isoolefin is not the same as the diolefin;
   wherein the $C_4$ to $C_7$ isoolefin is present in the composition in an amount of less than or equal to about 90 wt % based on the composition;
   wherein the alkylstyrene is present in the composition in an amount of greater than or equal to about 10 wt % based on the composition;
   wherein the diolefin is present in the composition in an amount of less than or equal to about 10 wt % based on the composition;
   wherein the elastomer has a number average molecular weight in a range from 111,000 to 115,000 and a molecular weight distribution (Mw/Mn) of less than 3.2, and a z-average molecular weight (Mz) in a range from 653,800 to 702,500;
   wherein the elastomer has a Mooney viscosity ML (1+8) at 125°° C. of less than 27 or about 34; and
   b. a secondary rubber;
   c. processing aid;
   d. curative; and
   e. filler.

12. The composition of claim 11, further comprising from about 20 to about 100 phr carbon black.

13. The composition of claim 11, further comprising from about 1 to about 30 phr clay.

14. A process to make the composition of claim 11, comprising the steps of
   a. polymerizing the $C_4$ to $C_7$ isoolefin, the alkylstyrene, and the diolefin to recover the elastomer;
   b. combining the elastomer, the secondary rubber, the processing aid, the curative, and the filler; and
   c. recovering the composition.

15. An article comprising the composition of claim 11.

* * * * *